Patented May 16, 1950

2,507,832

UNITED STATES PATENT OFFICE 2,507,832

WATER-SOLUBLE SALTS OF DIHYDRO-ERGOCRISTINE

Arthur Stoll and Albert Hofmann, Basel, Switzerland, assignors to Sandoz Limited, Basel, Switzerland, a Swiss firm No Drawing. Application June 5, 1946, Serial No. 674,640. In Switzerland April 20, 1940

3 Claims. (Cl. 260—236)

The present invention is a continuation-in-part of our co-pending patent application, Ser. No. 385,198, filed March 25, 1941, now abandoned, which relates to sympatheticolytically active dihydro-derivatives of lysergic acid amides.

The present invention more particularly relates to the preparation of water-soluble salts of dihydro-ergocristine.

Dihydro-ergocristine may be produced by hydrogenating ergocristine under pressure in the presence of a suitable catalyst and of a solvent and, in some cases, at an elevated temperature, the method of production of dihydro-ergocristine being described in detail in our co-pending patent application, Ser. No. 385,198 (cf. Example 4 thereof).

The preparation of the water-soluble salts of dihydro-ergocristine can be carried out by neutralizing a solution or a suspension of dihydro-ergocristine in a suitable solvent with the respective alkyl sulphonic acid. The salts thus obtained are generally beautifully crystallized compounds which are more or less soluble in water and which are useful products for therapeutical purposes, as they are much better soluble in water than the dihydro-ergocristine itself.

The following examples, without being limitative, describe the present invention.

Example 1

A solution of 6.11 parts by weight of dihydro-ergocristine (1/100 mol) in 60 parts by volume of methanol is treated with 10 parts by volume of n-methanolic solution of methane-sulphonic acid. The solution is then evaporated to dryness in vacuo and the residue dissolved in 15 parts by volume of acetone. From this solvent the new dihydro-ergocristine-methane-sulphonate crystallizes out in form of fine white needles which are filtered and, after washing with some acetone, dried in vacuo over calcium chloride. The new compound melts with decomposition at 230° C. (corr.) and possesses, after drying in high-vacuo, the formula $C_{35}H_{41}O_5N_5 \cdot CH_3SO_3H$. 1 part of the salt is soluble at 20° C. in 400 parts of water, thus yielding stable solutions.

Example 2

The dihydro-ergocristine ethane-sulphonate can be prepared in analogous manner to that described in Example 1. The new salt melts with decomposition at 215° C. (corr.) and possesses the formula $C_{35}H_{41}O_5N_5 \cdot CH_3CH_2SO_3H$. 1 part of this salt is soluble in 300 parts of water at 20° C., thus yielding stable solutions.

What we claim is:

1. The water-soluble alkyl-sulphonic acid salts of dihydro-ergocristine of the formula $$(C_{35}H_{41}O_5N_5) \cdot alkyl\ SO_3H$$

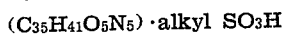

which compounds beautifully crystallize from an organic solvent, their crystals melting with decomposition and yielding stable aqueous solutions and the same being suitable for therapeutical purposes.

2. The water-soluble methane-sulphonic acid salt of dihydro-ergocristine of the formula $$C_{35}H_{41}O_5N_5 \cdot CH_3SO_3H$$

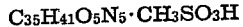

which crystallizes from acetone in form of fine white needles melting with decomposition at 230° C., 1 part of which is soluble at 20° C. in 400 parts of water yielding stable solutions, and which possesses valuable therapeutical properties.

3. The water-soluble ethane-sulphonic acid salt of dihydro-ergocristine of the formula $$C_{35}H_{41}O_5N_5 \cdot CH_3CH_2SO_3H$$

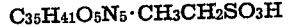

which crystallizes from acetone in form of fine white needles melting with decomposition at 215° C. (corr.), 1 part of which is soluble in 300 parts of water at 20° C. yielding stable solutions, and which possesses valuable therapeutical properties.

ARTHUR STOLL.
ALBERT HOFMANN.

REFERENCES CITED

The following references are of record in the file of this patent:

UNITED STATES PATENTS

| Number | Name | Date |
|---|---|---|
| 2,086,559 | Kharasch | July 13, 1937 |
| 2,156,242 | Kharasch et al. | Apr. 25, 1939 |

OTHER REFERENCES

Helv. Chim. acta, vol. 26 (1943), pp. 1570–1601 and 2070–2081.